United States Patent
Youn et al.

(10) Patent No.: US 11,532,810 B2
(45) Date of Patent: Dec. 20, 2022

(54) LITHIUM ELECTRODE, METHOD FOR MANUFACTURING SAME, AND LITHIUM SECONDARY BATTERY COMPRISING SAME

(71) Applicant: LG CHEM, LTD., Seoul (KR)

(72) Inventors: Suk Il Youn, Daejeon (KR); Byoungkuk Son, Daejeon (KR); Junghun Choi, Daejeon (KR); Woongchul Choi, Daejeon (KR); Minchul Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 240 days.

(21) Appl. No.: 16/646,370

(22) PCT Filed: Dec. 4, 2018

(86) PCT No.: PCT/KR2018/015216
§ 371 (c)(1),
(2) Date: Mar. 11, 2020

(87) PCT Pub. No.: WO2019/112278
PCT Pub. Date: Jun. 13, 2019

(65) Prior Publication Data
US 2020/0274146 A1    Aug. 27, 2020

(30) Foreign Application Priority Data
Dec. 4, 2017  (KR) .................. 10-2017-0164867

(51) Int. Cl.
*H01M 4/1395* (2010.01)
*H01M 4/36* (2006.01)
(Continued)

(52) U.S. Cl.
CPC ......... *H01M 4/1395* (2013.01); *H01M 4/366* (2013.01); *H01M 4/661* (2013.01);
(Continued)

(58) Field of Classification Search
None
See application file for complete search history.

(56) References Cited

U.S. PATENT DOCUMENTS

| 6,214,061 B1 | 4/2001 | Visco et al. |
| 2004/0241549 A1 | 12/2004 | Cho et al. |

(Continued)

FOREIGN PATENT DOCUMENTS

| CN | 1585163 A | 2/2005 |
| CN | 1812377 A | 5/2005 |

(Continued)

OTHER PUBLICATIONS

International Search Report (PCT/ISA/210) issued in PCT/KR2018/015216, dated Apr. 3, 2019.

(Continued)

*Primary Examiner* — Wyatt P McConnell
(74) *Attorney, Agent, or Firm* — Birch, Stewart, Kolasch & Birch, LLP

(57) ABSTRACT

A lithium electrode and a lithium secondary battery including the same. By using an olefin-based ion conducting polymer as a protective layer-forming material of a lithium electrode having a protective layer formed on a lithium metal layer, the lithium electrode may be protected from moisture or open air during a lithium electrode preparation process, lithium dendrite formation and growth from the lithium electrode may be prevented, and performance of a battery using the lithium electrode may be enhanced.

14 Claims, 3 Drawing Sheets

(51) Int. Cl.
  *H01M 4/66* (2006.01)
  *H01M 10/0525* (2010.01)
  *H01M 10/0565* (2010.01)
  *H01M 4/02* (2006.01)

(52) U.S. Cl.
  CPC ... *H01M 10/0525* (2013.01); *H01M 10/0565* (2013.01); *H01M 2004/021* (2013.01)

(56) References Cited

U.S. PATENT DOCUMENTS

| | | | |
|---|---|---|---|
| 2005/0079420 | A1 | 4/2005 | Cho et al. |
| 2005/0095504 | A1 | 5/2005 | Kim et al. |
| 2009/0191464 | A1 | 7/2009 | Ryu et al. |
| 2011/0068001 | A1* | 3/2011 | Affinito ............... H01M 4/0404 204/242 |
| 2016/0380314 | A1* | 12/2016 | Yang .................. H01M 10/052 429/231.95 |
| 2017/0062829 | A1* | 3/2017 | Ryu .................. H01M 10/0569 |
| 2017/0317352 | A1* | 11/2017 | Lee ...................... H01M 4/366 |
| 2017/0324097 | A1 | 11/2017 | Lee et al. |
| 2020/0127293 | A1 | 4/2020 | Son et al. |
| 2020/0274142 | A1 | 8/2020 | Youn et al. |

FOREIGN PATENT DOCUMENTS

| | | |
|---|---|---|
| CN | 102576855 A | 7/2012 |
| CN | 103227344 A | 7/2013 |
| CN | 106299244 A | 1/2017 |
| CN | 106486699 A | 3/2017 |
| CN | 107359309 A | 11/2017 |
| CN | 107394115 A | 11/2017 |
| CN | 109155396 A | 1/2019 |
| CN | 111201645 A | 5/2020 |
| EP | 3428998 A1 | 1/2019 |
| EP | 3 547 416 A1 | 10/2019 |
| EP | 3667774 A2 | 6/2020 |
| JP | 2000-315504 A | 11/2000 |
| JP | 2005-142156 A | 6/2005 |
| JP | 2017-199678 A | 11/2017 |
| JP | 2017-204468 A | 11/2017 |
| KR | 10-2001-0043145 A | 5/2001 |
| KR | 10-2005-0019483 A | 3/2005 |
| KR | 10-0515301 B1 | 9/2005 |
| KR | 10-0635684 B1 | 10/2006 |
| KR | 10-2009-0083710 A | 8/2009 |
| KR | 10-2015-0041350 A | 4/2015 |
| KR | 10-2015-0145046 A | 12/2015 |
| KR | 10-2016-0033608 A | 3/2016 |
| KR | 10-2016-0037610 A | 4/2016 |
| KR | 10-2016-052351 A | 5/2016 |
| KR | 10-2017-0001069 A | 1/2017 |
| KR | 10-2017-0026098 A | 3/2017 |
| KR | 10-2017-0123957 A | 11/2017 |
| KR | 10-2017-0124075 A | 11/2017 |
| KR | 10-2019-0011881 A | 2/2019 |
| WO | WO 2011/028251 A2 | 3/2011 |

OTHER PUBLICATIONS

Extended European Search Report for European Application No. 18885238.8, dated Oct. 15, 2020.

* cited by examiner

[Figure 1]
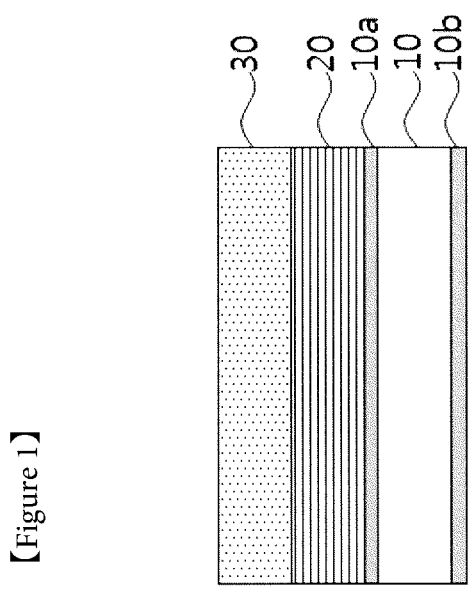

[Figure 2]
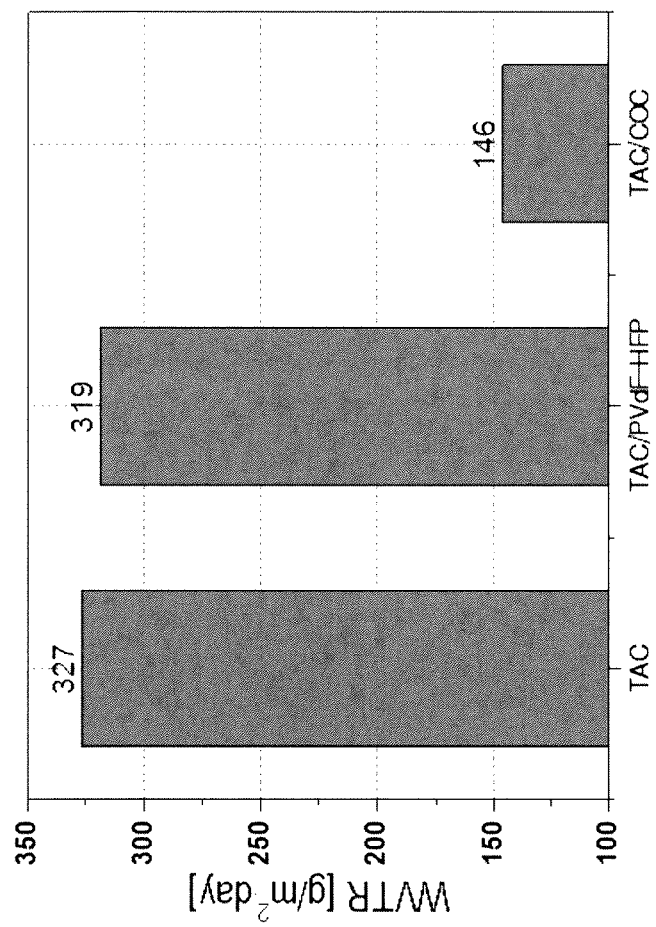

[Figure 3]
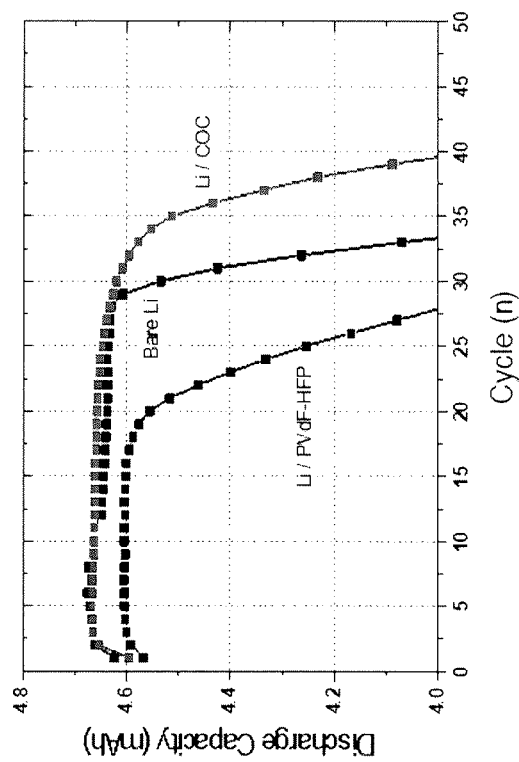

LITHIUM ELECTRODE, METHOD FOR MANUFACTURING SAME, AND LITHIUM SECONDARY BATTERY COMPRISING SAME

TECHNICAL FIELD

This application claims priority to and the benefits of Korean Patent Application No. 10-2017-0164867, filed with the Korean Intellectual Property Office on Dec. 4, 2017, the entire contents of which are incorporated herein by reference.

The present invention relates to a lithium electrode having enhanced lifetime properties, a method for preparing the same, and a lithium secondary battery including the same.

BACKGROUND ART

Until recently, there have been considerable interests in developing high energy density batteries using lithium as a negative electrode. For example, compared to other electrochemical systems having a lithium-inserted carbon electrode and a nickel or cadmium electrode reducing battery energy density by increasing a weight and a volume of a negative electrode with the presence of non-electroactive materials, lithium metal has low weight and high capacity properties, and therefore, has attracted much attention as a negative electrode active material of an electrochemical battery. A lithium metal negative electrode or a negative electrode including mainly lithium metal provides an opportunity to form batteries that are lighter and have higher energy density compared to batteries such as lithium-ion, nickel metal hydride or nickel-cadmium batteries. Such characteristics are highly preferred with batteries for portable electronic devices such as mobile phones and lap-top computers wherein premiums are paid in low weights.

Existing lithium ion batteries have energy density of approximately 700 wh/l using graphite in a negative electrode, and lithium cobalt oxide (LCO) in a positive electrode. However, with recent expansion of fields requiring high energy density, needs to increase energy density of lithium ion batteries have been constantly raised. For example, energy density needs to be increased in order to increase a driving distance of electric vehicles to 500 km or longer on a single charge.

In order to increase energy density of a lithium ion battery, use of a lithium electrode have increased. However, lithium metal is a metal highly reactive and difficult to handle, and has a problem of handling being difficult in a process.

In order to resolve such a problem, various attempts have been made to prepare electrodes using lithium metal.

For example, Korean Patent No. 0635684 relates to a method for forming a lithium electrode having a glass protective layer, and discloses a method for preparing a lithium electrode by forming a protective layer on a releasing agent layer-deposited substrate (PET), depositing lithium on the protective layer, and then depositing a current collector on the lithium, however, the lithium surface is exposed during the lithium deposition process increasing a thickness of an oxide layer (native layer), which may adversely affect lifetime properties of a battery.

In addition, polyvinylidene fluoride hexafluoropropylene (PVdF-HFP) has been used sometimes as a material of a protective layer for a lithium electrode, but has had a problem of lithium metal being damaged by external moisture due to insufficient moisture barrier properties.

Accordingly, development of technologies on methods for preparing a lithium electrode having a small and uniform thickness by minimizing oxide layer formation through protecting lithium from moisture and open air when preparing a lithium electrode has been continuously required.

PRIOR ART DOCUMENTS

Patent Documents (Patent Document 1) Korean Patent No. 0635684, "Method for Forming Encapsulated Lithium Electrode Having Glass Protective Layer"

(Patent Document 2) Korean Patent Application Laid-Open Publication No. 2017-0026098, "Lithium Metal Battery Including Lithium Metal Anode, Method of Preparing the Lithium Metal Anode, and Protective Layer Prepared According to the Method"

DISCLOSURE

Technical Problem

As a result of extensive studies in view of the above, the inventors of the present invention have identified that, by forming a protective layer to protect lithium metal that is vulnerable to moisture from moisture or open air and, as a material of the protective layer, introducing an olefin-based ion conducting polymer such as a cyclic olefin copolymer (COC) having ion conductivity and hydrophobicity properties, properties such as moisture barrier properties for lithium metal and lithium ion conductivity are strengthened compared to PVDF-HFP that has been generally used as a material of a protective layer for a lithium metal, and lithium dendrite formation and growth are prevented, and as a result, lifetime properties and energy density of a battery are enhanced.

Accordingly, an aspect of the present invention provides a lithium electrode including a protective layer formed with an olefin-based ion conducting polymer having excellent moisture barrier properties for lithium metal and lithium ion conductivity and capable of minimizing lithium dendrite formation and growth.

Another aspect of the present invention provides a method for preparing a lithium electrode including a protective layer formed with an olefin-based ion conducting polymer as described above.

Still another aspect of the present invention provides a lithium secondary battery including a lithium electrode as described above.

Technical Solution

According to an aspect of the present invention, there is provided a lithium electrode including a lithium metal layer; and a protective layer formed on at least one surface of the lithium metal layer, wherein the protective layer includes an olefin-based ion conducting polymer.

The olefin-based ion conducting polymer may be one or more types selected from the group consisting of a cyclic olefin copolymer (COC), polymethyl methacrylate (PMMA), polyacrylate, polycarbonate, polystyrene, polyurethane, polyimide and polyethylene naphthalate.

The protective layer may have ion conductivity of $10^{-6}$ S/cm to $10^{-1}$ S/cm.

The protective layer may have a thickness of 0.01 μm to 50 μm.

The lithium metal layer may be formed on one surface of a current collector.

The lithium metal layer may have a thickness of 5 μm to 50 μm.

According to another aspect of the present invention, there is provided a method for preparing a lithium electrode including transferring a lithium metal layer or a protective layer, wherein the lithium electrode has a protective layer including an olefin-based ion conducting polymer formed therein.

The method for preparing a lithium electrode may include (S1) forming a lithium metal protective layer by coating an olefin-based ion conducting polymer on a substrate; (S2) forming a lithium metal layer by depositing lithium metal on the protective layer; and (S3) transferring the lithium metal layer on a current collector.

The method for preparing a lithium electrode may include (P1) forming a protective layer by coating an olefin-based ion conducting polymer on a substrate; and (P2) transferring the protective layer on a lithium metal layer, and herein, the lithium metal layer may include rolled lithium.

A release layer may be formed on at least one surface of the substrate, and the release layer may be one or more types selected from the group consisting of Si, melamine and fluorine.

According to still another aspect of the present invention, there is provided a lithium secondary battery including the lithium electrode described above.

Advantageous Effects

According to the present invention, by using an ion conducting polymer exhibiting hydrophobicity such as a cyclic olefin copolymer (COC) as a material of a protective layer for protecting lithium metal in a lithium electrode, moisture barrier properties for lithium metal and lithium ion conductivity are more strengthened, and lithium dendrite formation and growth are prevented, and as a result, battery performance may be enhanced.

In addition, according to the present invention, a lithium electrode in which a current collector, a lithium metal layer and a protective layer are consecutively laminated may be prepared using a method of, for preparing the lithium electrode, depositing lithium metal on a lithium metal protective layer, and then transferring the result on a current collector. Herein, by using a method of forming a lithium metal layer on a current collector through transferring instead of directly depositing lithium metal on a current collector, a problem of a current collector being readily broken during a deposition process may be compensated, and as a result, a lithium electrode may be prepared using various types of current collectors.

In addition, according to the present invention, a lithium electrode may be prepared using a method of forming a lithium metal protective layer, and then transferring the lithium metal protective layer on a lithium metal layer formed with rolled lithium.

In addition, a lithium electrode having a small and uniform thickness can be prepared by the protective layer preventing lithium metal from being exposed to an external environment such as moisture or open air during a manufacturing process, and thereby minimizing oxide layer (native layer) formation on the lithium metal surface.

DESCRIPTION OF DRAWINGS

FIG. 1 is a mimetic diagram illustrating a lithium electrode laminate before transferring on a current collector in a process for preparing a lithium electrode according to the present invention.

FIG. 2 is a graph presenting results of measuring a water vapor transmission rate depending on film types.

FIG. 3 is a graph presenting discharge capacity and Coulombic efficiency measured by charging and discharging coin cells each manufactured in Example 2 and Comparative Examples 1 and 2.

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Lithium Electrode

The present invention relates to a lithium electrode comprising a lithium metal layer; and a protective layer formed on at least one surface of the lithium metal layer, wherein the protective layer includes an olefin-based ion conducting polymer.

Lithium metal is a material having high reactivity with moisture, and a surface of a lithium metal layer included in a lithium electrode may be deteriorated by reacting with moisture. In view of the above, the present invention provides a lithium electrode provided with a protective layer capable of enhancing battery performance while protecting the lithium electrode from moisture.

In the present invention, the olefin-based ion conducting polymer exhibits hydrophobicity and may protect a lithium metal layer from moisture or open air, and in addition, may be a polymer having excellent conductivity for lithium ions while being swollen in an electrolyte.

The olefin-based ion conducting polymer may have a solubility index of 15 Mpa to 45 Mpa, preferably 20 Mpa to 40 Mpa and more preferably 20 Mpa to 35 Mpa. The ion conducting polymer having a solubility index in the above-mentioned range has an advantage of conducting lithium ions by the protective layer being swollen by a solvent of an electrolyte liquid.

The olefin-based ion conducting polymer may be one or more types selected from the group consisting of a cyclic olefin copolymer (COC), polymethyl methacrylate (PMMA), polyacrylate, polycarbonate, polystyrene, polyurethane, polyimide and polyethylene naphthalate, and particularly, the cyclic olefin copolymer may be more advantageous as a protective layer material of a lithium metal layer due to its properties of being stable for an electrolyte liquid and moisture.

In the present invention, the olefin-based ion conducting polymer exhibits hydrophobic properties with low affinity for water, and may exhibit excellent moisture barrier properties for a lithium metal layer.

As a result, the olefin-based ion conducting polymer exhibits low a water vapor transmission rate, and exhibits a water vapor transmission rate of, for example, 200 g/m$^2$·day or less, preferably 180 g/m$^2$·day or less and more preferably 150 g/m$^2$·day or less, which is suitable as a material of a protective layer for a lithium electrode.

In the present invention, the protective layer may have ion conductivity of $10^{-6}$ S/cm to $10^{-1}$ S/cm, preferably $10^{-5}$ S/cm to $10^{-2}$ S/cm and more preferably $10^{-4}$ S/cm to $10^{-3}$ S/cm. This has an advantage of satisfying rate performance for driving a battery.

In addition, the protective layer may have a thickness of 0.01 µm to 50 µm, preferably 0.1 µm to 40 µm and more preferably 0.5 µm to 20 µm. When the thickness of the protective layer is less than the above-mentioned range, functions of protecting a lithium metal layer from moisture or open air become inferior damaging the lithium metal layer, or lithium dendrite growth may not be prevented, and the thickness being greater than the above-mentioned range may be disadvantageous for commercialization due to an increased electrode thickness.

In the present invention, the lithium metal layer may have a thickness of 5 µm to 50 µm, preferably 15 µm to 30 µm and more preferably 18 µm to 25 µm. When thickness of the lithium metal layer is less than the above-mentioned range, battery capacity and lifetime properties may decline, and the thickness being greater than the above-mentioned range may be disadvantageous for commercialization due to an increased lithium electrode thickness.

The lithium metal layer may be formed on one surface of a current collector, and in this case, the protective layer may be formed on the whole surface of the lithium metal layer except the surface of the lithium metal layer in contact with a current collector.

The lithium metal layer may be formed with rolled lithium, and rolled lithium metal may be attached on a current collector When the current collector is a porous current collector, the lithium metal layer may be included in a pore of the porous current collector, and herein, the protective layer may be provided on the whole surface of the porous current collector except a terminal connected to the porous current collector and extended to the outside.

Lithium Secondary Battery

The present invention also relates to a lithium secondary battery comprising a lithium electrode as described above.

In the lithium secondary battery, the lithium electrode may be included as a negative electrode, and the lithium secondary battery may include an electrolyte provided between the negative electrode and a positive electrode.

The shape of the lithium secondary battery is not limited, and examples thereof may include a coin-type, a flat plate-type, a cylinder-type, a horn-type, a button-type, a sheet-type or a laminate-type. In addition, the lithium secondary battery may be manufactured as a flow battery by further including tanks each storing a positive electrode electrolyte liquid and a negative electrode electrolyte liquid, and pumps moving each of the electrolyte liquids to an electrode cell.

The electrolyte may be an electrolyte liquid into which the negative electrode and the positive electrode are impregnated.

The lithium secondary battery may further include a separator provided between the negative electrode and the positive electrode. As the separator placed between the negative electrode and the positive electrode, any may be used as long as it separates and insulates a negative electrode and a positive electrode, and allows ion transport between the negative electrode and the positive electrode. For example, the separator may be a non-conductive porous membrane or an insulating porous membrane. More specifically, polymer non-woven fabrics such as non-woven fabrics made of polypropylene materials or non-woven fabrics made of polyphenylene sulfide materials; or porous films of olefin-based resins such as polyethylene or polypropylene may be included as an example, and these may be combined in two or more types.

The lithium secondary battery may further include a positive electrode electrolyte liquid on a positive electrode side and a negative electrode electrolyte liquid on a negative electrode side separated by a separator. The positive electrode electrolyte liquid and the negative electrode electrolyte liquid may each include a solvent and an electrolyte salt. The positive electrode electrolyte liquid and the negative electrode electrolyte liquid may be the same as or different from each other.

The electrolyte liquid may be an aqueous electrolyte liquid or a non-aqueous electrolyte liquid. The aqueous electrolyte liquid may include water as a solvent, and the non-aqueous electrolyte liquid may include a non-aqueous solvent as a solvent.

The non-aqueous solvent is not particularly limited, and those generally used in the art may be selected, and the non-aqueous solvent may be selected form the group consisting of, for example, carbonate-based, ester-based, ether-based, ketone-based, organosulfur-based, organophosphorous-based, aprotic solvents and combinations thereof.

The electrolyte salt refers to those dissociated into cations and anions in water or a non-aqueous organic solvent, is not particularly limited as long as it is capable of transferring lithium ions in a lithium secondary battery, and those generally used in the art may be selected.

In the electrolyte liquid, a concentration of the electrolyte salt may be greater than or equal to 0.1 M and less than or equal to 3 M. In this case, charge and discharge properties of a lithium secondary battery may be effectively obtained.

The electrolyte may be a solid electrolyte membrane or a polymer electrolyte membrane.

Materials of the solid electrolyte membrane and the polymer electrolyte membrane are not particularly limited, and those generally used in the art may be employed. For example, the solid electrolyte membrane may include a composite metal oxide, and the polymer electrolyte membrane may be a membrane having a conducting polymer provided inside a porous substrate.

In a lithium secondary battery, the positive electrode means an electrode in which lithium-containing ions are reduced by receiving electrons when discharging the battery. On the contrary, a role of a negative electrode (oxidation electrode) is performed when charging the battery, and electrons are released by oxidizing a positive electrode active material and lithium-containing ions are lost.

The positive electrode may include a positive electrode current collector and a positive electrode active material layer formed on the positive electrode current collector.

In the present specification, a material of a positive electrode active material of the positive electrode active material layer is not particularly limited as long as it reduces lithium-containing ions when discharged and oxidizes them when charged while being used in a lithium secondary battery with the negative electrode. For example, a transition metal oxide or a sulfur (S)-based composite may be included, and specifically, at least one of $LiCoO_2$, $LiNiO_2$, $LiFePO_4$, $LiMn_2O_4$, $LiNi_xCo_yMnzO_2$ (herein, x+y+z=1), $Li_2FeSiO_4$, $Li_2FePO_4F$ and $Li_2MnO_3$ may be included.

In addition, when the positive electrode is a sulfur (S)-based composite, the lithium secondary battery may be a lithium sulfur battery. The sulfur (S)-based composite is not particularly limited, and positive electrode materials generally used in the art may be selected and used.

The present specification provides a battery module including the lithium secondary battery as a unit cell.

The battery module may be formed by stacking with a bipolar plate provided between two or more of the lithium secondary batteries according to one embodiment of the present specification.

When the lithium secondary battery is a lithium air battery, the bipolar plate may be porous so as to provide air supplied from the outside to a positive electrode included in each of the lithium air electrodes. For example, porous stainless steel or porous ceramics may be included.

The battery module may be specifically used as a power supply of electric vehicles, hybrid electric vehicles, plug-in hybrid electric vehicles or systems for power storage.

Method for Preparing Lithium Electrode

The present invention also relates to, as a method for preparing a lithium electrode including a transferring process, a method for preparing a lithium electrode having a protective layer including an olefin-based ion conducting polymer formed therein. By the transferring process, a lithium metal layer may be transferred on a current collector, or a protective layer may be transferred on a lithium metal layer.

According to one preferred embodiment of the present invention, the method for preparing a lithium electrode relates to a method for preparing a lithium electrode including (S1) forming a lithium metal protective layer by coating an olefin-based ion conducting polymer on a substrate; (S2) forming a lithium metal layer by depositing lithium metal on the protective layer; and (S3) transferring the lithium metal layer on a current collector.

FIG. 1 is a mimetic diagram illustrating a lithium electrode laminate before transferring on a current collector in a process for preparing a lithium electrode according to the present invention.

When referring to FIG. 1, in the lithium electrode, a protective layer (20) and a lithium metal layer (30) are consecutively formed on a substrate (10) having a release layer (10a, 10b) formed on both surfaces, and then the result may be transferred on a current collector (not shown).

Hereinafter, the method for preparing a lithium electrode according to one preferred embodiment of the present invention will be described in more detail by each step.

Step (S1)

In step (S1), a protective layer for protecting lithium metal may be formed by coating an olefin-based ion conducting polymer on a substrate.

In the present invention, the protective layer protects lithium metal from an external environment such as moisture or open air in a series of processes preparing a lithium electrode, and may minimize formation of a surface oxide layer (native layer).

Accordingly, materials forming the protective layer need to have a high moisture-blocking ability, have stability for an electrolyte liquid, have a high electrolyte liquid moisture content, and have excellent oxidation-reduction stability.

The olefin-based ion conducting polymer has excellent ion conductivity and is stable for moisture and an electrolyte liquid.

Types of the olefin-based ion conducting polymer of the protective layer are as described above. The olefin-based ion conducting polymer for metal protection is dissolved in an organic solvent to prepare an olefin-based ion conducting polymer solution having a solid concentration of 0.1% to 10%, and the solution is coated to form a protective layer.

A coating solution for forming the protective layer may be prepared by dissolving the olefin-based ion conducting polymer as described above in a solvent, and herein, the solid concentration may be from 0.1% to 10%, preferably from 1% to 10% and more preferably from 2% to 5%. When the concentration of the coating solution is less than the above-mentioned range, viscosity is very low making the coating process difficult to proceed, and when the concentration is greater than the above-mentioned range, viscosity is high making it difficult to form the coating layer to a target coating thickness. Herein, the solvent for forming the coating solution may be one or more types selected from the group consisting of toluene, cyclohexane, N-methyl-2-pyrrolidone (NMP), dimethylformamide (DMF), dimethylacetamide (DMAc), tetramethyl urea, dimethyl sulfoxide (DMSO) and triethyl phosphate. Particularly, when using NMP, solubility of the polymer for forming the protective layer as described above is high, and forming the protective layer using a coating process may be advantageous.

In addition, a coating method for forming the protective layer may be selected from the group consisting of dip coating, spray coating, spin coating, die coating, roll coating, slot-die coating, bar coating, gravure coating, comma coating, curtain coating and micro-gravure coating, but is not limited thereto, and coating methods that may be used for forming a coating layer in the art may be diversely used.

The substrate may be a material capable of enduring a process condition such as a high temperature in a step of depositing lithium metal, and capable of preventing a problem of reverse peel-off, which is, during a winding process for transferring a deposited lithium metal layer on a current collector, the lithium metal layer being transferred on the substrate instead of the current collector.

For example, the substrate may include one or more types selected from the group consisting of polyethylene terephthalate (PET), polyimide (PI), poly(methyl methacrylate) (PMMA), cellulose tri-acetate (TAC), polypropylene, polyethylene and polycarbonate.

In addition, the substrate may have a release layer formed on at least one surface, and preferably may have a release layer formed on both surfaces. By the release layer, a problem of reverse peel-off, which is, during a winding process for transferring a deposited lithium metal layer on a current collector, the lithium metal layer being transferred on the substrate instead of the current collector may be prevented, and in addition thereto, the substrate may be readily separated after transferring the lithium metal layer on the current collector.

The release layer may include one or more types selected from the group consisting of Si, melamine and fluorine.

The release layer may be formed using a coating method, and although the coating method may be selected from the group consisting of, for example, dip coating, spray coating, spin coating, die coating and roll coating, the coating method is not limited thereto, and coating methods that may be used for forming a coating layer in the art may be diversely used.

In addition, the substrate may include an oligomer block coating on at least one surface. Herein, the oligomer block coating means a barrier for preventing oligomer migration caused by oligomers remaining in the substrate without being polymerized escaping outside the substrate and contaminating lithium.

For example, unpolymerized oligomers may be present in a PET film, and these oligomers may migrate outside the PET film and contaminate lithium, and therefore, the oligomer block coating may be formed on at least one surface of the PET film in order to prevent this phenomenon.

In addition, having a lower oligomer content in the substrate may be advantageous since the problem of the oligomer escaping from the substrate may be prevented.

Step (S2)

In Step (S2), a lithium metal layer may be formed by depositing lithium metal on the protective layer.

In the present invention, the lithium metal layer formed on the protective layer by deposition may have a thickness of 5 μm to 25 μm, preferably 10 μm to 20 μm, and more preferably 13 μm to 18 μm. The thickness of the lithium metal layer may vary depending on the application, and when using only lithium metal as an electrode, for example, a negative electrode material, the thickness of the lithium metal layer is sufficient when it is approximately 20 μm to 25 μm, however, when using lithium metal as a material for compensating irreversibility occurring in a negative electrode made of silicon oxide, the lithium metal layer may have a thickness of approximately 5 μm to 15 μm. When the thickness of the lithium metal layer is less than the above-mentioned range, battery capacity and lifetime properties may decline, and when the thickness is greater than the above-mentioned range, the thickness of a prepared lithium electrode becomes large, which is disadvantageous for commercialization.

In the present invention, a deposition method for depositing the lithium metal may be selected from among a vacuum deposition method (evaporation deposition), chemical deposition method chemical vapor deposition (CVD) and a physical vapor deposition method, but is not limited thereto, and deposition methods used in the art may be diversely used.

Step (S3)

In Step (S3), the lithium metal layer may be transferred on a current collector. Herein, the transfer may be carried out by winding a structure in which the substrate, the protective layer and the lithium metal layer are consecutively laminated, and transferring the lithium metal layer on a current collector using a device such as a roll press.

In the present invention, the current collector may be one type selected from the group consisting of copper, aluminum, nickel, titanium, baked carbon and stainless steel.

Directly depositing lithium metal on a current collector, particularly, directly depositing lithium metal on a copper current collector has a problem of the copper current collector being readily broken, however, in the present invention, a lithium electrode is prepared by, after forming a lithium metal layer, transferring the formed lithium metal layer itself on a current collector, and therefore, a lithium electrode may be prepared using various current collectors. In addition, when using the lithium electrode as a negative electrode, using a copper current collector may be most preferred.

According to the method for preparing a lithium electrode by one preferred embodiment of the present invention as described above, a lithium electrode in which a current collector, a lithium metal layer and a protective layer are consecutively laminated may be prepared by using a method of depositing lithium metal on a lithium metal protective layer and then transferring the result on a current collector to prepare the lithium electrode.

In addition, a lithium electrode having a small and uniform thickness may be prepared by minimizing oxide layer (native layer) formation on a lithium metal surface through preventing the lithium metal from being exposed to an external environment such as moisture and the open air by the protective layer during a manufacturing process.

Furthermore, by using a method of forming a lithium metal layer on a current collector through transferring instead of directly depositing lithium metal on a current collector, a problem of a current collector being readily broken during a deposition process may be compensated, and as a result, a lithium electrode may be prepared using various types of current collectors.

In addition, the lithium electrode prepared as above has excellent thickness uniformity while having a small thickness and therefore, may greatly enhance energy density when used in a battery.

According to another preferred embodiment of the present invention, the method for preparing a lithium electrode may include (P1) forming a protective layer by coating an olefin-based ion conducting polymer on a substrate; and (P2) transferring the protective layer on a lithium metal layer.

Method for Preparing a Lithium Electrode

Hereinafter, the method for preparing a lithium electrode according to another preferred embodiment of the present invention will be described in more detail by each step.

Step (P1)

In Step (P1), a protective layer may be formed by coating an olefin-based ion conducting polymer on a substrate. Step (P1) is the same as Step (S1) described above.

Step (P2)

In Step (P2), the protective layer formed in Step (P1) may be transferred on a lithium metal layer.

Herein, the lithium metal layer may be formed with rolled lithium, and the rolled lithium may be formed on at least one surface of a current collector.

According to the method for preparing a lithium electrode by another preferred embodiment of the present invention as described above, a lithium electrode in which a current collector, a lithium metal layer and a protective layer are consecutively laminated may be prepared using a method of forming a lithium metal protective layer and then transferring the lithium metal protective layer on a lithium metal layer to prepare a lithium electrode.

In addition, a lithium electrode having a small and uniform thickness may be prepared by the protective layer preventing lithium metal from being exposed to an external environment such as moisture or open air during a manufacturing process, and thereby minimizing oxide layer (native layer) formation on the lithium metal surface.

In addition, the lithium electrode prepared as above has excellent thickness uniformity while having a small thickness since rolled lithium is used as a lithium metal layer, and as a result, may greatly enhance energy density when used in a battery.

Hereinafter, preferred examples are provided in order to illuminate the present invention, however, the following examples are for illustrative purposes only, and it is obvious to those skilled in the art that various modifications and changes may be made within the category and the scope of technological ideas of the present invention, and such modifications and changes also fall within the scope of the attached claims.

Preliminary Experimental Example: Experiment on Moisture Barrier Properties of COC In order to judge suitability of COC as a material of a protective layer for a lithium electrode, a COC water vapor transmission rate (WVTR) was measured, and moisture barrier properties were identified. Herein, the water vapor transmission rate ($g/m^2 \cdot day$) means an amount [g] of water passing through a film with an area of 1 $m^2$ for a day, and a lower water vapor transmission rate means favorable moisture barrier properties.

Water was put in each of three cups, and the three cups were covered with each of a triacetyl cellulose film (TAC), a film coating PVdF-HFP on TAC (TAC/PVdF-HFP) and a film coating COC on TAC (TAC/COC). Herein, as the TAC, UZ60 Grade of Fuji Corporation.

After a day had passed, a water vapor transmission rate for each of the films was measured using a water vapor transmission rate measuring device (TSY-T3, Labthink International).

FIG. 2 is a graph presenting results of measuring a water vapor transmission rate depending on film types.

When referring to FIG. 2, water vapor transmission rates of the TAC, the TAC/PVdF-HFP and the TAC/COC were measured as 327 g, 319 g and 146 g, respectively, and it was identified that, with a water vapor transmission rate of the TAC/COC being the lowest leading to excellent moisture barrier properties, COC has suitable properties as a material of a protective layer for a lithium electrode.

Example 1: Preparation of Lithium Electrode and Lithium Secondary Battery (1) Preparation of Lithium Electrode As a substrate, a release PET film (manufactured by SKC hi-tech & marketing (former SKC Haas) RX12G 50 μm) having a release layer formed on both surfaces was prepared.

On one surface of the substrate, a cyclic olefin copolymer (COC) coating solution was prepared as a coating solution for forming a protective layer for protecting lithium metal. The COC coating solution was prepared as a solution having a 5% solid concentration by dissolving COC (manufactured by Topas, 6013 Grade) in a cyclohexane solvent.

The COC coating solution was coated on one surface of the release PET film to a thickness of 0.2 μm using a micro-gravure coater to form a COC protective layer.

A lithium metal layer having a thickness of 20 μm was formed by depositing lithium metal on the protective layer using a vacuum deposition method (evaporation deposition) at a temperature of 600° C., and a structure in which the release PET film, the COC protective layer and the lithium metal layer are consecutively laminated was wound at a rate of 1 m/min.

After that, the lithium metal layer was transferred on a Cu current collector using a roll press machine (calendering machine CLP-1015, manufactured by CIS) to prepare a lithium electrode in which the Cu current collector, the lithium metal layer and the COC protective layer are consecutively laminated.

(2) Manufacture of Lithium Secondary Battery

A coin cell-type lithium secondary battery was manufactured in a composition of the electrode prepared using the above-mentioned method, a positive electrode of LCO (manufactured by LandF Corporation, LFX20N), and an electrolyte liquid of mixing ethylene carbonate (EC), diethyl carbonate (DEC) and dimethyl carbonate (DMC) in a ratio of 1:2:1 and adding 1 mol of $LiPF_6$ and 2 wt % of vinylene carbonate (VC) thereto.

Example 2: Preparation of Lithium Electrode and Lithium Secondary Battery (1) Preparation of Lithium Electrode As a substrate, a release PET film (manufactured by SKC hi-tech & marketing (former SKC Haas) RX12G 50 μm) having a release layer formed on both surfaces was prepared.

On one surface of the substrate, a cyclic olefin copolymer (COC) coating solution was prepared as a coating solution for forming a protective layer for protecting lithium metal. The COC coating solution was prepared as a solution having a 5% solid concentration by dissolving COC (manufactured by Topas, 6013 Grade) in a cyclohexane solvent.

The COC coating solution was coated on one surface of the release PET film to a thickness of 0.2 μm using a micro-gravure coater to form a COC protective layer.

In addition, rolled lithium (Honjo Metal Co., Ltd., Japan) was prepared as a lithium metal layer, and Cu foil was adhered on one surface of the rolled lithium.

After that, the COC protective layer was transferred on the rolled lithium metal layer using a roll press machine (calendering machine CLP-1015, manufactured by CIS) to prepare a lithium electrode in which the Cu current collector, the rolled lithium metal layer and the COC protective layer are consecutively laminated (Li/COC).

(2) Manufacture of Lithium Secondary Battery

A coin cell-type lithium secondary battery was manufactured in a composition of the electrode prepared using the above-mentioned method, a positive electrode of LCO (manufactured by LandF Corporation, LFX20N), and an electrolyte liquid of mixing ethylene carbonate (EC), diethyl carbonate (DEC) and dimethyl carbonate (DMC) in a ratio of 1:2:1 and adding 1 mol of $LiPF_6$ and 2 wt % of vinylene carbonate (VC) thereto.

Comparative Example 1: Preparation of Lithium Electrode and Lithium Secondary Battery Preparation was performed in the same manner as in Example 1 except that Bare Li was used as the lithium electrode, and a lithium secondary battery was manufactured using the same (Bare Li).

Comparative Example 2: Preparation of Lithium Electrode and Lithium Secondary Battery A lithium electrode and a lithium secondary battery were prepared in the same manner as in Example 1, except that, instead of the COC coating solution, a PVDF-HFP coating solution prepared as a 5% solution by dissolving PVDF-HFP (manufactured by Arkema, LBG Grade) in an NMP solvent was used as the coating solution for forming a protective layer to form a PVDF-HFP protective layer (Li/PVdF).

Experimental Example 1: Measurement on Discharge Capacity and Coulombic Efficiency of Lithium Electrode For the coin cells manufactured in each of Example 1 and Comparative Examples 1 and 2, charge and discharge C-rates were set at 0.2 C and 0.5 C, respectively, in a charger and discharger, and then a cycle progressed.

FIG. 3 is a graph presenting discharge capacity and Coulombic efficiency measured by charging and discharging the coin cells each manufactured in Example 2 and Comparative Examples 1 and 2.

When referring to FIG. 3, it was seen that, whereas charge and discharge progressed close to 25 cycles in the coin cell of Example 2 (Li/COC), cycle fading started before cycles in the coin cell of Comparative Example 2 (Li/PVdF), and a cycle life of Example 2 also increased compared to Comparative Example 1 (Bare Li). From such results, it was seen that lifetime properties were able to be enhanced when using COC in a protective layer of a lithium electrode.

Hereinbefore, the present invention has been described with reference to limited examples and drawings, however, the present invention is not limited thereto, and by those skilled in the art, various changes and modifications may be made within technological ideas of the present invention and the range of equivalents of the attached claims.

REFERENCE NUMERAL

10: Substrate
10a, 10b: Release Layer

20: Protective Layer
30: Lithium Metal Layer

The invention claimed is:

1. A lithium electrode comprising:
   a lithium metal layer; and
   a protective layer formed on at least one surface of the lithium metal layer,
   wherein the protective layer comprises an olefin-based ion conducting polymer, and
   wherein the olefin-based ion conducting polymer consists of a cyclic olefin copolymer (COC).

2. The lithium electrode of claim 1, wherein the protective layer has ion conductivity of $10^{-6}$ S/cm to $10^{-1}$ S/cm.

3. The lithium electrode of claim 1, wherein the protective layer has a thickness of 0.01 µm to 50 µm.

4. The lithium electrode of claim 1, further comprising:
   a current collector,
   wherein the lithium metal layer is formed on one surface of the current collector.

5. The lithium electrode of claim 1, wherein the lithium metal layer has a thickness of 5 µm to 50 µm.

6. A method for preparing a lithium electrode comprising:
   transferring a lithium metal layer or a protective layer,
   wherein the protective layer comprises an olefin-based ion conducting polymer formed therein, and
   wherein the olefin-based ion conducting polymer consists of a cyclic olefin copolymer (COC).

7. The method for preparing a lithium electrode of claim 6, comprising:
   (S1) forming a protective layer by coating an olefin-based ion conducting polymer on a substrate;
   (S2) forming a lithium metal layer by depositing lithium metal on the protective layer; and
   (S3) transferring the lithium metal layer on a current collector.

8. The method for preparing a lithium electrode of claim 6, comprising:
   (P1) forming a protective layer by coating an olefin-based ion conducting polymer on a substrate; and
   (P2) transferring the protective layer on a lithium metal layer.

9. The method for preparing a lithium electrode of claim 8, wherein the lithium metal layer comprises rolled lithium.

10. The method for preparing a lithium electrode of claim 7, wherein a release layer is formed on at least one surface of the substrate.

11. The method for preparing a lithium electrode of claim 8, wherein a release layer is formed on at least one surface of the substrate.

12. The method for preparing a lithium electrode of claim 10, wherein the release layer comprises one or more selected from the group consisting of Si, melamine and fluorine.

13. The method for preparing a lithium electrode of claim 11, wherein the release layer comprises one or more selected from the group consisting of Si, melamine and fluorine.

14. A lithium secondary battery comprising the lithium electrode of claim 1.

* * * * *